US012799325B2

(12) United States Patent
Yan et al.

(10) Patent No.: US 12,799,325 B2

(45) Date of Patent: Nov. 17, 2026

(54) POLYAMIDE COMPOSITION WITH INCLINED PLANE TRACKING RESISTANCE

(71) Applicant: BASF SE, Ludwigshafen am Rhein (DE)

(72) Inventors: Dong Yan, Shanghai (CN); Rui Dou, Shanghai (CN); Jia Yan Deng, Shanghai (CN)

(73) Assignee: BASF SE, Ludwigshafen Am Rhein (DE)

(*) Notice: Subject to any disclaimer, the term of this patent is extended or adjusted under 35 U.S.C. 154(b) by 680 days.

(21) Appl. No.: 18/043,074

(22) PCT Filed: Aug. 16, 2021

(86) PCT No.: PCT/EP2021/072739

§ 371 (c)(1), (2) Date: Feb. 27, 2023

(87) PCT Pub. No.: WO2022/043115

PCT Pub. Date: Mar. 3, 2022

(65) Prior Publication Data

US 2023/0312920 A1 Oct. 5, 2023

(30) Foreign Application Priority Data

Aug. 28, 2020 (WO) ................ PCT/CN2020/112171

(51) Int. Cl.
*C08L 77/06* (2006.01)

(52) U.S. Cl.
CPC ......... *C08L 77/06* (2013.01); *C08L 2205/025* (2013.01); *C08L 2205/03* (2013.01)

(58) Field of Classification Search
CPC . C08L 77/06; C08L 2205/025; C08L 2205/03
See application file for complete search history.

(56) References Cited

U.S. PATENT DOCUMENTS

| | | | | |
|---|---|---|---|---|
| 5,298,301 A * | 3/1994 | Midgley | ................ | H01B 17/32 428/398 |
| 8,257,417 B2 | 9/2012 | Chen et al. | | |
| 2012/0277354 A1* | 11/2012 | Konig | ..................... | C08L 79/02 524/100 |
| 2020/0277491 A1* | 9/2020 | Hörold | ..................... | C08K 7/14 |

FOREIGN PATENT DOCUMENTS

| | | | | |
|---|---|---|---|---|
| CN | 102105119 A | 6/2011 | | |
| CN | 102732000 A | 10/2012 | | |
| CN | 102732002 A | 10/2012 | | |
| CN | 102732025 A | 10/2012 | | |
| CN | 102775780 A * | 11/2012 | ............... | B29B 7/90 |
| CN | 103073877 A | 5/2013 | | |
| CN | 103224703 A | 7/2013 | | |
| CN | 103788640 A | 5/2014 | | |
| JP | 7075532 B1 * | 5/2022 | ............ | C09J 201/00 |

OTHER PUBLICATIONS

English machine translation of JP7075532B. (Year: 2022).*
English machine translation of CN102775780A. (Year: 2012).*
Database WPI, Week 201318, Thomson Scientific, Database accession No. 2013-B01264, XP002804698, Oct. 17, 2012, 2 pages.
Database WPI, Week 201322, Thomson Scientific, Database accession No. 2013-B01315, XP002804699, Oct. 17, 2012, 2 pages.
Database WPI, Week 201409, Thomson Scientific, Database accession No. 2013-Q20380, XP002804701, May 1, 2013, 3 pages.
Database WPI, Week 201446, Thomson Scientific, Database accession No. 2014-M99429, XP002804700, May 14, 2014, 3 pages.
International Search Report and Written Opinion for corresponding PCT/EP2021/072739 mailed Nov. 17, 2021; 15 pages.

* cited by examiner

*Primary Examiner* — John E Uselding
(74) *Attorney, Agent, or Firm* — Armstrong Teasdale LLP

(57) ABSTRACT

Disclosed herein is a method for improving Inclined Plane tracking (IPT) property at voltage higher than 1 kV by using a polyamide composition. The polyamide composition includes a) 10 to 50 wt % of at least one semi-crystalline aliphatic polyamide having on average, from 3 to 5 carbon atoms, not including the carbon atom in the carbonyl group, per amide group; b) 1 to 40 wt % of at least one long-chain aliphatic polyamide having on average equal to or more than 6 carbon atoms, not including the carbon atom in the carbonyl group, per amide group; c) 0 to 35 wt % of flame retardant; d) 0 to 50 wt % of fibrous and/or particulate filler; e) 1 to 25 wt % of impact modifier, and f) 0 to 20 wt % of other additives.

16 Claims, No Drawings

POLYAMIDE COMPOSITION WITH INCLINED PLANE TRACKING RESISTANCE

CROSS-REFERENCE TO RELATED APPLICATIONS

This application is a U.S. National Phase Application of International Patent Application No. PCT/EP2021/072739, filed Aug. 16, 2021, which claims priority to Chinese Patent Application PCT/CN2020/112171, filed Aug. 28, 2020, each of which is hereby incorporated by reference herein.

TECHNICAL FIELD

The present invention relates to a method for improving the inclined plane tracking (IPT) property at voltage of above 1 kV by using a polyamide composition. The polyamide composition comprises a) 10 to 50 wt % of at least one semi-crystalline aliphatic polyamide having on average, from 3 to 5 carbon atoms, not including the carbon atom in the carbonyl group, per amide group; b) 1 to 40 wt % of at least one long-chain aliphatic polyamide having on average equal to or more than 6 carbon atoms, not including the carbon atom in the carbonyl group, per amide group; c) 0 to 35 wt % of flame retardant; d) 0 to 50 wt % of fibrous and/or particulate filler; e) 1 to 25 wt % of impact modifier, and f) 0 to 20 wt % of other additives. The present invention also relates to polyamide compositions and articles produced thereby.

BACKGROUND

The wide application of polymer materials as high voltage insulation began after introduction of epoxy resins in 1950s. At the beginning the polymers were used for indoor conditions. Rosenthal company introduced composite insulators made of silicone in 1976. The profile of polymer insulators can be complicated, and their parts can be thinner than that made of ceramics. Unfortunately, the polymers are many times less resistant to surface discharges than ceramic materials. Therefore, a few methods were worked out to promote the degradation resistance of the polymer under high voltage.

Polyamide 66 (PA66) is a very important engineering thermoplastic polymer since it combines several desirable properties such as high strength and rigidity, high toughness, high heat resistance, excellent wear resistance, good electrical properties and chemical resistance, high flowability and excellent processability. PA66, as an insulating material, is widely used in automotive, electrical and electronic applications.

Comparative Tracking Index (CTI), according to IEC 60112, is the most common test for estimating the sensitivity of plastics with respect to the surface tracking, providing an indication of the performance of the insulating materials. CTI is an accelerated test method under wet and contaminated conditions, where a voltage is applied between two electrodes placed on the surface of the material.

Inclined plane tracking (IPT) is an effective way to evaluate the erosion and tracking resistance caused by discharge effect of insulative materials under high voltage effect (>1 kV) in humidity condition. Polymers are organic materials that consist of molecules that are not bonded to each other as tightly as those in the inorganic materials such as porcelain and glass. They can be degraded at much lower temperature than porcelain. Carbon formed during the degradation makes the surface conducting and leads to electrical failure, which is no longer able to withstand the applied voltage. The formation of carbon conducting path on the surface is referred to as tracking. The most common polymeric materials used as high voltage application is silicone rubber, EPR rubber, cycloaliphatic epoxy, polycarbonates because of their excellent properties in terms of tracking and erosion, hydrophobicity, UV stability, etc. Factors including organic filler type, filler size, filler conductivity, carbon content of based polymer, etc. will influence the IPT value. Normally the test range of voltage of IPT is no higher than 1 kV.

CN102732002A discloses a glass fiber reinforced PA66/PA11 alloy with high CTI value. The CTI value is improved via a combination of non-ferrous red phosphorus, antimigration agent and high CTI-value agent. However, the patent application didn't disclose the definition of high CTI-value agent.

CN 102105119A discloses the application of PA1010 and polypropylene resin in improving the toughness and flexibility of PA 66. CN103224703A discloses that styrene-acrylonitrile could improve the toughness of polyamide composite, which comprises PA66 and PA1212. Such combination of polyamides focuses on the improvement of toughness property, not relating to the tracking resistance property of polyamide resin.

Photovoltaic ("PV") market is moving from 1 kVA power grids to 1.5 kVA power grids and this move has resulted in new regulations for PV connectors and junction boxes. In the field of engineering plastics, there are many products used in the photovoltaic application; however, few attentions are paid for high voltage application before, especially voltage as high as 1.2 kV, 1.5 kV or 2 kV. Polyamides with low carbon number of dicarboxylic acid or lactam, such as PA 6 and PA 66 are widely used in the photovoltaic market considering its good mechanical and processing property. However, such polyamides cannot meet the requirement of the PV application with voltage higher than 1.5 kV.

SUMMARY OF THE PRESENT INVENTION

One object of the present invention is to provide a method for improving inclined plane tracking property at voltage higher than 1 kV by using a long-chain aliphatic polyamide having on average equal to or more than 6 carbon atoms, not including the carbon atom in the amide group, per amide group.

Another object of the present invention is to provide a method for improving inclined plane tracking property at voltage higher than 1 kV by using a polyamide composition, the composition comprising:

a) 10 to 50 wt % of at least one semi-crystalline aliphatic polyamide having on average, from 3 to 5 carbon atoms, not including the carbon atom in the carbonyl group, per amide group;
b) 1 to 40 wt % of at least one long-chain aliphatic polyamide having on average equal to or more than 6 carbon atoms, not including the carbon atom in the carbonyl group, per amide group;
c) 0 to 35 wt % of flame retardant;
d) 0 to 50 wt % of fibrous and/or particulate filler;
e) 1 to 25 wt % of impact modifier, and
f) 0 to 20 wt % of other additives.

In a preferred embodiment, the long-chain aliphatic polyamides are selected from polyamide 1212, polyamide 610, polyamide 612, polyamide 1010 and polyamide 6/6.36.

In a preferred embodiment, the flame retardant comprises (c1) 3-15 wt % of red phosphorous and (c2) 1-10 wt % of triazine-based flame retardant, based on the total weight of the polyamide composition. The triazine-based flame retardant is preferably melamine phosphate, dimelamine phosphate, melamine pyrophosphate, melamine polyphosphate, dimelamine pyrophosphate, dimelazines phosphate or melamine polyphosphates.

In a preferred embodiment, the filler is glass fiber, preferably alkali-free E-glass fiber. The other additives f) may include antioxidant, lubricating dispersing agent.

In a preferred embodiment, the weight ratio of polyamide components a) and b) in the polyamide composition is 5:1 to 1:1, and preferably 4:1 to 1:1 and more preferably 3.5:1 to 2.5:1, especially 3:1.

Compared with the prior art, the polyamide composition provided by the present invention has the advantages of high Charpy notched (≥16 $kJ/m^2$ at 23 °C and ≥8 $kJ/m^2$ at −40 °C) and unnotched impact strength (≥75 $kJ/m^2$ at 23 °C and ≥65 $kJ/m^2$ at −40 °C), high CTI value (>600V), V0 of UL94 at 1.6 mm and 0.8 mm thickness and high IPT value (≥60 mins at 1.5 kV), and can be widely used in electrical applications, such as, photovoltaic connector nut and body, outdoor insulative electrical plastic parts.

Another object of the present invention is to provide an article produced by the polyamide composition, which exhibits excellent tracking resistance properties under voltage above 1 kV, for example, 1.2 kV or above, 1.5 kV or above, or up to 2 kV. The article is preferably nut or body of photovoltaic connector or electrically insulative plastic parts.

Another object of the present invention is to provide a polyamide composition comprising a) 10 to 50 wt % of at least one semi-crystalline aliphatic polyamide having on average, from 3 to 5 carbon atoms, not including the carbon atom in the carbonyl group, per amide group;
b) 1 to 40 wt % of at least one long-chain aliphatic polyamide having on average equal to or more than 6 carbon atoms, not including the carbon atom in the carbonyl, per amide group;
c) 4 to 25 wt % of flame retardant including as component c1), red phosphorous and as component c2), triazine-based flame retardant, the triazine-based flame retardant preferably being melamine phosphate, dimelamine phosphate, melamine pyrophosphate, melamine polyphosphate, dimelamine pyrophosphate, dimelazines phosphate or melamine polyphosphates;
d) 0 to 50 wt % of fibrous and/or particulate filler;
e) 1 to 25 wt % of impact modifier, and
f) 0 to 20 wt % of other additives.

DETAILED DESCRIPTION OF THE PRESENT INVENTION

Unless defined otherwise, all technical and scientific terms used herein have the meaning commonly understood by a person skilled in the art to which the invention belongs. As used herein, the following terms have the meanings ascribed to them below, unless specified otherwise.

As used herein, the articles "a" and "an" refer to one or to more than one (i.e., to at least one) of the grammatical object of the article. By way of example, "an element" means one element or more than one element.

As used herein, the term "about" is understood to refer to a range of numbers that a person of skill in the art would consider equivalent to the recited value in the context of achieving the same function or result.

As used herein, the term "additives" refers to additives included in a formulated system to enhance physical or chemical properties thereof and to provide a desired result. Such additives include, but are not limited to, dyes, pigments, toughening agents, impact modifiers, rheology modifiers, plasticizing agents, thixotropic agents, natural or synthetic rubbers, filler agents, reinforcing agents, thickening agents, opacifiers, inhibitors, fluorescence or other markers, thermal degradation reducers, thermal resistance conferring agents, surfactants, wetting agents, defoaming agents, dispersants, flow or slip aids, biocides, and stabilizers.

Unless otherwise identified, all percentages (%) are "percent by weight".

The radical definitions or elucidations given above in general terms or within areas of preference apply to the end products and correspondingly to the starting materials and intermediates. These radical definitions can be combined with one another as desired, i.e. including combinations between the general definition and/or the respective ranges of preference and/or the embodiments.

All the embodiments and the preferred embodiments disclosed herein can be combined as desired, which are also regarded as being covered within the scope of the present invention.

"AB" in the AB-polyamides represents that there is one nitrogen atom and one carbonyl group in the repeat units of AB-polyamides; "AABB" in the AABB-polyamides represents that there are two nitrogen atoms and two carbonyl groups in the repeat units of AABB-polyamides.

Unless otherwise identified, the temperature refers to room temperature and the pressure refers to ambient pressure.

Unless otherwise identified, the solvent refers to all organic and inorganic solvents known to the persons skilled in the art and does not include any type of monomer molecular.

The inventor of the present invention has surprisingly found that the inclined plane tracking property at voltage higher than 1 kV of a polyamide composition could be improved by using a long-chain aliphatic polyamide having on average equal to or more than 6 carbon atoms, not including the carbon atom in the carbonyl group, per amide group.

The present invention provides a method for improving inclined plane tracking property at voltage higher than 1 kV by using a polyamide composition, the composition comprising:

a) 10 to 50 wt % of at least one semi-crystalline aliphatic polyamide having on average, from 3 to 5 carbon atoms, not including the carbon atom in the carbonyl group, per amide group;
b) 1 to 40 wt % of at least one long-chain aliphatic polyamide having on average equal to or more than 6 carbon atoms, not including the carbon atom in the carbonyl group, per amide group;
c) 0 to 35 wt % of flame retardants;
d) 0 to 50 wt % of fibrous and/or particulate filler;
e) 1 to 25 wt % of impact modifiers, and
f) 0 to 20 wt % of other additives.

Said high voltage is higher than 1 kV, and is preferably 1.2 kV or above, more preferably 1.5 kV or above, and even up to 2 kV.

The Number of Carbon Atoms Per Amide Group

In the case of AB-polyamides, the number of carbon atoms per amide group is defined as the number of carbon atoms between the nitrogen atom and the carbonyl group per amide group. An example of AB-polyamides is polyamide 6 which is derived from caprolactam, the number of carbon atoms between the nitrogen atom and the carbonyl group here is 5, then the number of carbon atoms per amide group for polyamide 6 is 5. Another example of AB-polyamides is polyamide 11 which is derived from laurin lactam, the number of carbon atoms per amide group for polyamide 11 is 10.

In the case of AABB-polyamides, which are derived from diamines and dicarboxylic acids, the number of carbon atoms per amide group is the average value of the number of carbon atoms ($C_{DA}$) between the two nitrogen atoms of the diamine and the number of carbon atoms ($C_{DS}$) between the two carbonyl groups of the dicarboxylic acid. The number of carbon atoms per amide group in this case is obtained from the sum of $C_{DA}$ and $C_{DS}$ divided by 2, i.e. $(C_{DA}+C_{DS})/2$. The division by 2 is necessary, since two amide groups can be formed by two nitrogen atoms and two carboxy groups. The carbon atoms ($C_{DA}$) between the two nitrogen atoms include the carbon atoms in the branched chain of the diamine. The carbon atoms ($C_{DS}$) between the two carbonyl groups include the carbon atoms in the branched chain of the dicarboxylic acid. An example of AABB-polyamides is the polyamide 610 which is produced from hexamethylenediamine and sebacic acid. Since polyamide 610 has 6 carbon atoms between the two nitrogen atoms and 8 carbon atoms between the two carbonyl groups, there is obtained (6+8)/2=7 carbon atoms per amide group for polyamide 610.

The number of carbon atoms per amide group for the mixtures of polyamides (a) or (b) is the average carbon atom number of all the polyamides (a) or (b), the weight ratios of the polyamides (a) or (b) in the mixtures to be taken into account.

a) Semi-Crystalline Aliphatic Polyamide Having on Average, from 3 to 5 Carbon Atoms Per Amide Group The component a) in the present invention could be derived from aliphatic dicarboxylic acids and aliphatic diamines, lactams, and/or amino acids, wherein the aliphatic dicarboxylic acids preferably have from 4 to 6 carbon atoms, the aliphatic diamines preferably have from 4 to 6 carbon atoms, the lactams preferably have from 4 to 6 carbon atoms, the carbon atoms herein include all carbon atoms constituting the dicarboxylic acid, diamine or lactam.

The component a) in the present invention includes the copolyamide or the blends of at least one semi-crystalline aliphatic polyamide (a) in the present invention.

Examples of component a) in the present invention include PA4, PA6, PA56, PA46, PA66 and/or PA 6/66, preferable is PA66. PA66 has excellent flame retardancy, and conventional PA66 products that are commonly used in the polyamide industry can be suitably selected in the present invention. Preferably, PA66 that is suitably used as component a) may have a viscosity number of 90-300 ml/g, preferably 110-200 ml/g, more preferably 110-170 ml/g, measured in a polyamide solution at a concentration of 0.005 g/ml in 96 wt % sulfuric acid according to ISO 307-2007. Suitable PA66 can be commercially available as Zytel® 101 NC010 from DuPont, Akromid® A from AKRO-PLASTIC, Durethan® A30S from LANXESS, Ultramid® A from BASF.

PA6 has excellent flame retardancy, and conventional PA6 products that are commonly used in the polyamide industry can be suitably selected in the present invention. Preferably, PA6 that is suitably used as component a) may have a viscosity number of 90-260 ml/g, preferably 110-200 ml/g, measured in a polyamide solution at a concentration of 0.005 g/ml in 96 wt % sulfuric acid according to ISO 307-2007. Suitable PA6 can be commercially available as Zytel® 7301 NC010 from DuPont, Akromid® B from AKRO-PLASTIC, Durethan® B30SFN30 from LANXESS, Ultramid® B from BASF.

The polyamide component a) is in an amount of from 10 to 50% by weight, preferably from 15 to 45% by weight and in particular from 20 to 40% by weight, based on the total weight of the polyamide composition.

b) Long-Chain Aliphatic Polyamide Having on Average, Equal to or More than 6 Carbon Atoms Per Amide Group The component b) in the present invention could be derived from aliphatic dicarboxylic acids and aliphatic diamines, lactams, and/or amino acids, wherein the aliphatic dicarboxylic acids preferably have 6 or more carbon atoms, the aliphatic diamines preferably have 6 or more carbon atoms, the lactams preferably have 6 or more carbon atoms, the carbon atoms herein include all carbon atoms constituting the dicarboxylic acid, diamine or lactam.

The polyamide component b) is in an amount of from 1 to 40% by weight, preferably from 5 to 30% by weight, more preferably from 8 to 25% by weight and in particular from 10 to 25% by weight, based on the total weight of the polyamide composition.

The aliphatic dicarboxylic acids to form the long-chain aliphatic polyamide in the present invention is the conventional diacid used to produce polyamide, preferably is aliphatic dicarboxylic acid of from 6 to 40 carbon atoms, more preferably is of from 6 to 36 carbon atoms, further more preferably is of from 6 to 20 or 36, most preferably is of 6, 8, 9, 10, 11, 12, 13, 14, 15, 16, 17, 18 and/or 36 carbon atoms. The aliphatic diamine to form the long-chain aliphatic polyamide in the present invention is the conventional diamine used to produce polyamide, preferably is aliphatic diamine of from 6 to 24 carbon atoms, more preferably is from 6 to 18, most preferably is of 6, 8, 9, 10, 11, 12, 13 and/or 14 carbon atoms. The carbon atoms herein include all carbon atoms constituting the dicarboxylic acid, or diamine.

The lactams to form the long-chain aliphatic polyamide in the present invention could be decanelactam, capryllactam, and/or laurin lactam.

The long chain aliphatic polyamide could preferably be at least one selected from the group consisting of PA 7, PA8, PA9, PA11, PA12, PA68, PA610, PA612, PA614, PA618, PA88, PA810, PA812, PA1010, PA1012, PA1014, PA1018, PA1210, PA1212, PA1214, PA1218, PA1313, PA1410, PA1412, PA 1414, PA1418 and PA6.36, more preferably is PA610, PA1010, PA1012, PA1210 and/or PA1212. In a preferred embodiment, the component b) is PA1212.

The component b) in the present invention could include blends of at least two long-chain aliphatic polyamides and/or long-chain aliphatic polyamide copolymerized co-polyamide.

The long-chain aliphatic polyamide copolymerized copolyamide is the polyamide copolymer in which the building segments of the polyamide copolymer comprising at least one long-chain aliphatic polyamide segment (segment A), the rest segment(s) of the polyamide copolymer could be non-long chain aliphatic polyamide segments or the other long chain segment(s) except segment A, the examples of the rest segments could be PA 6 or PA 66. Example that can be mentioned is PA6/6.36, which is the copolymer of PA6 and PA6.36, the latter formed from hexamethylene diamine and a C36 dicarboxylic acid. Other examples are PA66/610, PA6/610, and PA66/6/610.

There is no limitation of the type of the copolymer, for example block copolymer, random copolymer, graft copolymer or alternating copolymer is suitable for the present invention.

The long-chain aliphatic polyamide in the invention could have the conventional molecule weight in polyamide composition, and the intrinsic viscosity of the long chain polyamide is preferably from 90 to 200 ml/g, determined in a polyamide solution at a concentration of 0.005 g/ml in 96 wt % sulfuric acid at 25 °C according to ISO 307.

In a preferred embodiment, the weight ratio of the polyamide components a) and b) in the polyamide composition is 5:1 to 1:1, and preferably 4:1 to 1:1 and more preferably 3.5:1 to 2.5:1, especially 3:1.

C) Flame Retardant

The flame retardant c) could preferably be phosphorus-based flame retardant, halogenated flame retardant, nitrogenous-based flame retardant, and/or mineral-based flame retardant. It can be used in untreated form.

Examples of the mineral-based flame retardant are antimony trioxide, alkali earth metal oxides such as zinc oxide or magnesium oxide, metal hydroxides such as magnesium hydroxide or aluminum hydroxide, metal borates such as zinc borate.

Phosphorus-based flame retardant includes inorganic and organic phosphorous-containing flame retardants.

Examples of inorganic phosphorous-containing flame retardants are red phosphorus, zinc phosphate, ammonium phosphate, ammonium pyrophosphate, ammonium polyphosphate, preferably is red phosphorous.

Examples of the organic phosphorus-based flame retardant are ethylene-diamine phosphate, piperazine phosphate, piperazine pyrophosphate, dialkylphosphate or the combination of dialkylphosphate and metal salt of phosphorous acid.

The dialkylphosphate could be aluminum dimethylphosphinate, aluminum ethylmethylphosphinate, aluminum diethylphosphinate, aluminum methyl-n-propylphosphinate, calcium dim ethylphosphinate, magnesium dimethylphosphinate, zinc dimethylphosphinate, calcium ethylmethylphosphinate, magnesium ethylmethylphosphinate, zinc ethylmethylphosphinate, calcium diethylphoshinate, magnesium diethylphosphinate, zinc diethylphosphinate, calcium methyl-n-propylphosphinate, magnesium methyl-n-propylphosphinate, and/or zinc methyl-n-propylphosphinate. Among them, aluminum diethylphosphinate, zinc diethylphosphinate, aluminum dimethylphosphinate and zinc dimethylphosphinate are more preferable.

The metal salt of phosphorous could be $Al(H_2PO_3)_3$, $Al_2(HPO_3)_3$, $Zn(HPO_3)$, $Al_2(HPO_3)_3 \cdot 4H_2O$ and/or $Al(OH)(H_2PO_3)_2 \cdot 2H_2O$. The suitable organic phosphorus-based flame retardant can be commercially available as OP1230, OP1400 from Clariant.

The nitrogenous-based flame retardant is preferable triazine-based flame retardant. Examples of the triazine-based flame retardant are melamine or a derivative thereof, such as melam, melem, melamine cyanurate, melamine sulfate, melamine borate, melamine oxalate, silicate melamine, melamine phosphate, dimelamine phosphate, melamine pyrophosphate, melamine polyphosphate, dimelamine pyrophosphate, dimelazines phosphate or melamine polyphosphates, melam pyrophosphate, melam polyphosphate, melem phosphate, melem pyrophosphate, melem polyphosphate, and phosphates, pyrophosphates, melamine neopentyl glycol borate and polyphosphates of higher condensation products of melamine and/or melem. Preference is given to melamine polyphosphate salts derived from a 1,3,5-triazine compound of which the number n for the average degree of condensation is from 20 to 200, and 1,3,5-triazine content, per mole of phosphorus atom, is from 1.1 to 2.0 mol of a 1,3,5-triazine compound selected from the group consisting of melamine, melam, melem, melon, ammeline, ammelide, 2-ureidomelamine, acetoguanamine, benzoguanamine, and diaminophenyltriazine. It is preferable that the n value for salts of this type is generally from 40 to 150 and that the 1,3,5-triazine compound: mole of phosphorus atom ratio is from 1.2 to 1.8.

Example of halogenated flame retardant is brominated polystyrene.

The flame retardant, as component c), is in an amount of from 0 to 35% by weight, preferably from 4 to 25% by weight, and in particular from 8 to 18% by weight, based on the total weight of the polyamide composition.

In one preferred embodiment, the flame retardant in the invention could be selected from the group consisting of red phosphorus, antimony trioxide, dialkylphosphate, the combination of dialkylphosphate and metal salt of phosphorous acid, and triazine-based flame retardant.

In one preferred embodiment, the flame retardant in the invention could be red phosphorus.

The red phosphorus could be used in the form of red phosphorus masterbatch. The content of red phosphorus in the masterbatch could be from 30 wt % to 60 wt %. The base resin in the masterbatch could be the impact modifier e) of the present invention.

In one preferred embodiment, the flame retardant in the invention includes as component c1), red phosphorous and as component c2), triazine-based flame retardant, preferably is melamine phosphate, dimelamine phosphate, melamine pyrophosphate, melamine polyphosphate, dimelamine pyrophosphate, dimelazines phosphate or melamine polyphosphates. The component c1) is preferably in an amount of 3-20% by weight, more preferably of 10-15% by weight, of the polyamide composition. The component c2) is preferably in an amount of 1-10% by weight, more preferably of 3-8% by weight, of the polyamide composition.

In one preferred embodiment, the flame retardant in the invention includes as component c1), red phosphorous in an amount of 3-20%, preferably 10-15% by weight, and as component c2) melamine phosphate and/or dimelamine phosphate in an amount of 1-10%, preferably 3-8% by weight, based on the total weight of the polyamide composition.

In one preferred embodiment, the flame retardant in the invention comprises from 15 to 35% by weight of organic phosphorous-containing flame retardants, based on the total weight of the polyamide composition.

In one preferred embodiment, the flame retardant in the invention comprises from 15 to 35% by weight of dialkylphosphate, or the combination of dialkylphosphate and metal salt of phosphorous, based on the total weight of the polyamide composition. In one preferred embodiment, the flame retardant in the invention comprises from 20 to 25% by weight of dialkylphosphate, or the combination of dialkylphosphate and metal salt of phosphorous, based on the total weight of the polyamide composition.

In one preferred embodiment, the flame retardant in the invention comprises from 15 to 35% by weight of dialkylphosphate selected from the group consisting of aluminum dimethylphosphinate, aluminum ethylmethylphosphinate, aluminum diethylphosphinate, aluminum methyl-n-propylphosphinate, zinc diethylphosphinate and zinc dimethylphosphinate, based on the total weight of the polyamide composition.

In one preferred embodiment, the flame retardant in the invention comprises from 15 to 35% by weight of the combination of dialkylphosphate and metal salt of phosphorous, based on the total weight of the polyamide composition. The dialkylphosphate is selected from the group consisting of aluminum dimethylphosphinate, aluminum ethylmethylphosphinate, aluminum diethylphosphinate, aluminum methyl-n-propylphosphinate, zinc diethylphosphinate and zinc dimethylphosphinate, the metal salt of phosphorous is selected from the group consisting of $Al(H_2PO_3)_3$, $Al_2(HPO_3)_3$, $Zn(HPO_3)$, $Al_2(HPO_3)_3 \cdot 4H_2O$ and/or $Al(OH)(H_2PO_3)_2 \cdot 2H_2O$.

The average particle size ($d_{50}$) of the organic phosphorus-based flame retardant particles dispersed in the polyamide compositions is preferably in the range from 0.0001 to 0.5 mm, in particular from 0.001 to 0.2 mm.

In one preferred embodiment, the flame retardant in the invention comprises from 5 to 15%, preferably from 5 to 10%, by weight of mineral-based flame retardant and from 10 to 30%, preferably from 15 to 25% by weight of halogenated flame retardant, based on the total weight of the polyamide composition. The mineral-based flame retardant is preferably antimony trioxide. The halogenated flame retardant is preferably brominated polystyrene.

A person skilled in the art is aware of other suitable nitrogen-containing flame retardants.

d) Fibrous and/or Particulate Filler

The fibrous and/or particulate filler in the present invention can the conventional filler in the polyamide composition. The fillers may comprise, for example, fibers selected from the group consisting of glass fibers, carbon fibers, and mineral fibers. Preferably, the composition comprises at least glass fibers, carbon fibers or a combination thereof. The glass fiber can, for example, be selected from A-glass, C-glass, D-glass, E-glass, H-glass, M-glass, R-glass and S-glass fiber, or any mixtures thereof. Preference is given to alkali-free E-glass fiber, or a mixture of glass fibers comprising E-glass fiber and one or more other glass fibers. These can be used in the form of rovings or chopped glass in the forms commercially available. The glass fiber may have an average length of 2 to 7 mm, and more preferably 3 to 6 mm. The diameter of glass fiber is preferably 3 to 20 μm, more preferably 7 to 13 μm. Examples of the cross-sectional shape of the fibrous reinforcing agent include a circle, a rectangle, an ellipse, and other non-circular cross sections, preferably is circle.

Fillers that may be used are all particulate fillers known to those skilled in the art. These include, in particular, particulate fillers selected from the group consisting of minerals, talc, mica, dolomite, silicates, quartz, wollastonite, kaolin, silicic acids, magnesium, carbonate, magnesium hydroxide, chalk, ground glass, glass flakes, glass beads, hollow glass beads and mixture thereof.

In one preferred embodiment, the fibrous and/or particulate filler in the present invention are chopped glass fibers and/or carbon glass fibers.

The polyamide composition of the present invention comprises 0-50 wt %, preferably 10-40 wt %, more preferably 15-30 wt % of component d), based on the total weight of the polyamide composition.

e) Impact Modifier

The polyamide composition comprises, as component e), amounts of from 1 to 25% by weight, preferably from 5 to 20% by weight, in particular from 8 to 15% by weight, impact modifiers (often also termed elastomeric polymers, elastomers, or rubbers), based on the total weight of the polyamide composition.

The impact modifier is preferably derived from at least two monomers which are selected from the group consisting of alpha-olefin, diene, ethylenically unsaturated nitrile, and ethylenically unsaturated carboxylic acid and epoxy compound, ester and acid anhydride thereof, more preferably is derived from at least one of alpha-olefin, diene, ethylenically unsaturated carboxylic acid, ester of unsaturated carboxylic acid and ethylenically unsaturated nitrile, and at least one of epoxy compound or acid anhydride of unsaturated carboxylic acid.

The alpha-olefin preferably has from 2 to 20 carbon atoms, more preferably has from 4 to carbon atoms. Examples of the alpha-olefin are ethylene, propylene, 1-butylene, isobutene, 1-pentene, 1-hexene, 1-octene, 4-methyl-1-pentene, 3-methyl-1-pentene, 3,5,5-trimethyl-1-hexene, 1-decene and mixture thereof, more preferably is ethylene, propylene, 1-butene, 1-hexene, isobutene, mixture of ethylene and propylene, mixture of ethylene and 1-octene, mixture of ethylene and 1-butene, mixture of propylene and 4-methyl-1-pentene, mixture of propylene and 1-butene, mixture of ethylene, propylene and 1-butene, and mixture of 1-decene and 1-methyl-1-pentene, most preferably is ethylene, 1-butene, 1-propylene, 1-pentene, and mixture of ethylene and 1-octene.

The diene is preferably conjugated diene such as 1,3-butadiene, 1,3-pentadiene, isoprene, 1,3-hexadiene and mixtures thereof, non-conjugated dienes having from 5 to 25 carbon atoms such as 1,4-pentadiene, 1,4-hexadiene, 1,5-hexadiene, 2,5-dimethyl-1,5-hexadiene, 1,4-octadiene and mixtures thereof, cyclic dienes such as cyclopentadiene, cyclohexadienes, cyclooctadienes, dicyclopentadiene, alkenylnorbornenes such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]-3,8-decadiene, and mixtures thereof. Preference is given to 1,3-butadiene, 1,3-pentadiene and/or isoprene, more preferably is 1,3-butadiene.

The ethylenically unsaturated nitrile monomer is preferably selected from the group consisting of acrylonitrile, methacrylonitrile, fumaronitrile and α-cyanoethylacrylonitrile, more preferably is acrylonitrile and/or methacrylonitrile, most preferably is acrylonitrile.

The ethylenically unsaturated carboxylic acid has at least one carbon-carbon double bond and at least one carboxyl group. Examples of the ethylenically unsaturated carboxylic acid is acrylic acid, methacrylic acid, maleic acid, fumaric acid, glutaconic acid, itaconic acid, citraconic acid, 2-ethylacrylic acid, 2-chloroacrylic acid, crotonic acid, isocrotonic acid, angelic acid, sorbic acid, mesaconic acid, cinnamic acid, more preferably is acrylic acid, methacrylic acid, maleic acid, fumaric and/or citraconic acid.

The epoxy compound of the ethylenically unsaturated carboxylic acid could be carboxylic acid glycidyl ester, glycidyl ether, and/or the like. Examples of the epoxy compound of the ethylenically unsaturated acid are glycidyl acrylate, glycidyl methacrylate, maleic acid 1-glycidyl ester, diglycidyl ester of maleic acid, monoglycidyl ester of itaconic acid, diglycidyl ester of itaconic acid, monoglycidyl ester of citraconic acid, diglycidyl ester of citraconic acid, monoglycidyl ester of butenetricarboxylic acid, preferably is glycidyl acrylate and/or glycidyl methacrylate.

The ester of the ethylenically unsaturated carboxylic acid is preferably the ester of acrylic acid and/or acetic acid, more preferably is an alkyl ester and/or a hydroxy alkyl ester of acrylic acid and/or acetic acid, such as $C_1$-$C_{18}$, more preferably $C_1$-$C_{12}$, most preferably $C_1$-$C_4$ alkyl ester and/or $C_1$-$C_{18}$, more preferably $C_1$-$C_{12}$, most preferably $C_1$-$C_4$ hydroxy alkyl ester of acrylic acid and/or acetic acid. Examples of the ester of the ethylenically unsaturated carboxylic acid are methyl methacrylate, methyl acrylate, ethyl methacrylate, ethyl acrylate, propyl acrylate, propyl methacrylate, butyl acrylate, butyl methacrylate, isobutyl acrylate, isobutyl methacrylate, 2-ethylhexyl acrylate, octyl acrylate, otctyl methacrylate, decyl acrylate, decyl methacrylate, isodecyl acrylate, isodecyl methacrylate, lauryl acrylate, lauryl methacrylate, dimethyl maleate, monomethyl maleate, hydroxyethyl methacrylate (HEMA), stearyl methacrylate, stearyl acrylate, isobornyl acrylate, isobornyl methacrylate, hydroxypropyl methacrylate and vinyl acetate; more preferably is methyl methacrylate, methyl acrylate, ethyl methacrylate, ethyl acrylate, propyl acrylate, propyl methacrylate, butyl acrylate, butyl methacrylate, isobutyl acrylate, and/or isobutyl methacrylate, most preferably is methyl methacrylate, methyl acrylate, butyl acrylate and/or butyl methacrylate.

The acid anhydride of the ethylenically unsaturated carboxylic acid is preferably selected from the group consisting of maleic anhydride (MAH), acrylic anhydride, methacrylic anhydride, itaconic anhydride, citraconic anhydride, fumaric anhydride, nadic anhydride, methyl nadic anhydride, himic anhydride, and methyl himic anhydride, more preferably is maleic anhydride, (meth)acrylic anhydride and/or fumaric anhydride.

The monomer of the impact modifier is preferably selected from the group consisting of ethylene, 1-butene, 1-propylene, 1-pentene, 1-octene, 1,3-butadiene, acrylonitrile, methacrylonitrile, glycidyl acrylate, glycidyl methacrylate, methyl methacrylate, methyl acrylate, butyl acrylate, butyl methacrylate, maleic anhydride, acrylic anhydride, glycidyl acrylate, and glycidyl methacrylate.

Polymers of the impact modifier are described by way of example in Houben-Weyl, Methoden der organischen Chemie, volume 14/1 (Georg-Thieme-Verlag, Stuttgart, 1961), pp 392 to 406, and in the monograph "Toughened Plastics" by C. B. Bucknall (Applied Science Publishers, London, 1977).

Some preferred types of these impact modifiers are described below.

In one embodiment of the present invention, the impact modifier is derived from at least two monomers of alpha-olefins, or the combination of alpha-olefin and conjugated diene.

In one embodiment of the present invention, the impact modifier is derived from two monomers of ethylene, propylene, and/or octene. The impact modifier is preferably ethylene-propylene (EPM) rubber, or ethylene-octene copolymer.

In one embodiment of the present invention, the impact modifier is derived from alpha-olefin and diene. The impact modifier is preferably ethylene-propylene-diene (EPDM) rubber.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM rubbers and EPDM rubbers may preferably also have been grafted with the ethylenically unsaturated carboxylic acid and/or with the epoxy compound, ester and acid anhydride thereof. Examples of the grafted monomers are acrylic acid, methacrylic acid, glycidyl (meth)acrylate, and also maleic anhydride.

In one embodiment of the present invention, the impact modifier is derived from alpha-olefin, epoxy compound of ethylenically unsaturated carboxylic acid and styrene. The alpha-olefin herein is preferably ethylene, butylene and/or propylene, more preferably is ethylene and butylene. The examples of the epoxy compound of the ethylenically unsaturated carboxylic acid herein are preferably glycidyl acrylate and/or glycidyl methacrylate (GMA). The epoxy compound of ethylenically unsaturated carboxylic acid thereof herein is preferably grafted to the polyolefin/polystyrene co-blocks or copolymerized to polyolefin/polystyrene co-blocks.

In one preferred embodiment of the present invention, the impact modifier is GMA grafted polypropylene or GMA grafted styrene-ethylene-butylene (SEBS) copolymer.

In one embodiment of the present invention, the impact modifier is derived from at least one alpha-olefin, at least one of ethylenically unsaturated carboxylic acid and at least one of epoxy compound of ethylenically unsaturated carboxylic acid. The examples of the alpha-olefin herein are ethylene, butylene and propylene. The examples of the ethylenically unsaturated carboxylic acid are acrylic acid, methacrylic acid, maleic acid and fumaric, preferably is acrylic acid and methacrylic acid. The examples of the epoxy compound of the ethylenically unsaturated carboxylic acid herein are preferably glycidyl acrylate and/or glycidyl methacrylate (GMA). The impact modifier is preferably ethylene/acrylic/GMA ternary copolymer.

In one embodiment of the present invention, the impact modifier is derived from at least one alpha-olefin, at least one of ester of ethylenically unsaturated carboxylic acid and at least one polyester ether elastomer. The examples of alpha-olefin herein are ethylene and/or butylene. The examples of the ester of the ethylenically unsaturated carboxylic acid herein are methyl methacrylate, methyl acrylate, ethyl acrylate, butyl acrylate and/or butyl methacrylate.

Copolymers of (e-1) alpha-olefin with (e-2) the ethylenically unsaturated carboxylic acid, epoxy compound, ester and/or acid anhydride of the ethylenically unsaturated carboxylic acid are another group of preferred rubbers. The copolymers could be block, alternating, random or grafted copolymers, preferably is the block and/or grafted copolymers. The (e-1) alpha-olefin is preferably ethylene, butylene, propylene and/or octene. The component (e-2) is preferably one or more of acrylic acid, methacrylic acid, maleic acid, fumaric acid, methyl methacrylate, methyl acrylate, butyl acrylate, butyl methacrylate, maleic anhydride, (meth) acrylic anhydride, fumaric anhydride, glycidyl acrylate, and glycidyl methacrylate.

In one embodiment of the present invention, the impact modifier is derived from at least one monomer (e-1) of alpha-olefin, and at least one monomer (e-2) of epoxy compound of ethylenically unsaturated carboxylic acid and/or acid anhydride of ethylenically unsaturated carboxylic acid. The alpha-olefin herein is preferably ethylene, butylene, propylene and/or octene. The examples of the epoxy compound of the ethylenically unsaturated carboxylic acid herein are preferably glycidyl acrylate and/or glycidyl methacrylate (GMA). The acid anhydride of the ethylenically unsaturated carboxylic acid is preferably maleic anhydride. The monomer (e-2) herein is preferably grafted to the polyolefin blocks or copolymerized to polyolefin blocks. The impact modifier is preferably GMA grafted ethylene, GMA grafted polypropylene, GMA grafted ethylene-butylene copolymer, GMA grafted ethylene-octene.

In one preferred embodiment, the impact modifier in the present invention could be derived from ethylene and octene.

The copolymers are advantageously composed of from 50 to 98% by weight of (e-1) the alpha-olefin, from 0.1 to 20% by weight of the component (e-2).

Particular preference is given to copolymers composed of from 50 to 98% by weight, in particular from 55 to 95% by weight, of ethylene and/or octene, from 0.1 to 20% by weight, in particular from 0.3 to 20% by weight, of glycidyl acrylate and/or glycidyl methacrylate, (meth)acrylic anhydride and/or maleic anhydride, and from 1 to 45% by weight, in particular from 5 to 40% by weight, of (meth)acrylic acid, n-butyl acrylate and/or 2-ethylhexyl acrylate.

The ethylene copolymers described above may be produced by processes known per se, preferably by random copolymerization at high pressure and elevated temperature. Appropriate processes are well-known.

Particularly preferred impact modifiers are selected from maleic anhydride functionalized polyolefin, maleic anhydride functionalized polyethylene copolymer, glycidyl methacrylate functionalized ethylene and methyl acrylate terpolymer or combination thereof.

The molar mass of the impact modifier is preferably from 10,000 to 500,000 g/mol, more preferably from 15,000 to 400,000 g/mol (Mn, determined by means of GPC in 1,2,4-trichlorobenzene with PS calibration).

It is also possible, of course, to use a mixture of the types of impact modifiers listed above.

f) Additives

The polyamide composition comprises 0-20 wt % of other additives, including antioxidant, lubricating dispersing agent, UV stabilizers, pigments, colorants, antistatic agents, thickeners, thixotropic agents, surface-active agents, viscosity modifiers, plasticizers or nucleating agents.

Suitable antioxidant that can be mentioned is a hindered phenolic antioxidant with a phosphate antioxidant lipid compound system. Suitable hindered phenols are in principle all of the compounds which have a phenolic structure, and which have at least one bulky group on the phenolic ring.

Examples of compounds that can be used with preference are those of the Formula I Formula I

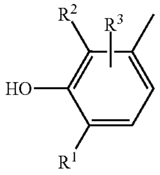

where:

$R^1$ and $R^2$ are an alkyl group, a substituted alkyl group, or a substituted triazole group, and where the radicals $R^1$ and $R^2$ may be identical or different, and $R^3$ is an alkyl group, a substituted alkyl group, an alkoxy group, or a substituted amino group.

Another group of preferred hindered phenols is provided by those derived from substituted benzenecarboxylic acids, in particular from substituted benzenepropionic acids.

Particularly preferred compounds from this class are compounds of the Formula II Formula II

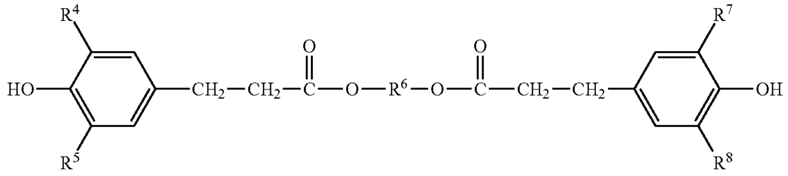

where $R_4$, $R_5$, $R_7$, and $R_8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl)propionate], and also N,N'-hexamethylene-bis-3,5-di-tert-butyl-4-hydroxyhydrocinnamide (Irganox® 1098), and the product Irganox® 245 described above from BASF SE, which has particularly good suitability.

Suitable flame retardant accelerator includes zinc oxide, modified zinc oxide, Zn borate, Zn stannate, MgO, $Mg(OH)_2$, $ZnCO_3$, $MgCO_3$, $CaCO_3$, and AlOOH, particular preference being given here to zinc oxide and modified zinc oxide.

Suitable lubricating dispersing agent includes zinc stearate, calcium stearate, ethylene bis stearic acid amine, oleic acid amide, erucic acid amide, polyethylene wax, or combination thereof.

Suitable colorant includes inorganic pigments, such as titanium dioxide, iron oxide, and carbon black.

In one preferred embodiment, the method for improving inclined plane tracking property at voltage higher than 1 kV by using a polyamide composition, the composition comprising:

a) 20 to 40 wt % of at least one semi-crystalline aliphatic polyamide selected from the group consisting of PA 6, PA 66 and PA6/66;
b) 8 to 25 wt % of at least one long-chain aliphatic polyamide selected from the group consisting of PA1212, 610, 612, 1010 and PA6/6.36;
c) 3 to 20 wt % of red phosphorous and 1-10 wt % of triazine-based flame retardant;
d) 10 to 40 wt % of fibrous and/or particulate filler; e) 0 to 15 wt % of impact modifiers, and
f) 0 to 20 wt % of other additives; based on the total weight of the polyamide composition.

In one preferred embodiment, the method for improving inclined plane tracking property at voltage higher than 1 kV by using a polyamide composition, the composition comprising:

a) 20 to 40 wt % of at least one semi-crystalline aliphatic polyamide selected from the group consisting of PA 6, PA 66 and PA6/66;
b) 8 to 25 wt % of at least one long-chain aliphatic polyamide selected from the group consisting of PA1212, 610, 612, 1010 and PA6/6.36;
c) 3 to 20 wt % of red phosphorous and 1-10 wt % of triazine-based flame retardant;
d) 10 to 40 wt % of fibrous and/or particulate filler;
e) 5 to 15 wt % of impact modifiers, and
f) 0 to 20 wt % of other additives; based on the total weight of the polyamide composition.

In one preferred embodiment, the method for improving inclined plane tracking property at voltage higher than 1 kV by using a polyamide composition, the composition comprising:

a) 20 to 40 wt % of at least one semi-crystalline aliphatic polyamide selected from the group consisting of PA 6, PA 66 and PA6/66;
b) 8 to 15 wt % of at least one long-chain aliphatic polyamide selected from the group consisting of PA1212, 610, 612, 1010 and PA6/6.36; wherein the weight ratio of component a) to b) is 3.5:1 to 2.5:1;
c) 4 to 25 wt % of flame retardant;
d) 20 to 40 wt % of fibrous and/or particulate filler;
e) 5 to 15 wt % of impact modifiers, and
f) 0 to 20 wt % of other additives; based on the total weight of the polyamide composition.

In one preferred embodiment, the method for improving inclined plane tracking property at voltage higher than 1 kV by using a polyamide composition, the composition comprising:

a) 20 to 40 wt % of at least one semi-crystalline aliphatic polyamide selected from the group consisting of PA 6, PA 66 and PA6/66;
b) 8 to 15 wt % of at least one long-chain aliphatic polyamide selected from the group consisting of PA1212, 610, 612, 1010 and PA6/6.36; wherein the weight ratio of component a) to b) is 3.5:1 to 2.5:1;
c) 3 to 20 wt % of red phosphorous, or the combination of 3 to 20 wt % of red phosphorous and 1-10 wt % of triazine-based flame retardant;
d) 20 to 40 wt % of fibrous and/or particulate filler;
e) 5 to 15 wt % of impact modifiers, and
f) 0 to 20 wt % of other additives; based on the total weight of the polyamide composition.

In one preferred embodiment, the method for improving inclined plane tracking property at voltage higher than 1 kV by using a polyamide composition, the composition comprising:

a) 20 to 40 wt % of at least one semi-crystalline aliphatic polyamide selected from the group consisting of PA 6, PA 66 and PA6/66;
b) 8 to 15 wt % of at least one long-chain aliphatic polyamide selected from the group consisting of PA1212, 610, 612, 1010 and PA6/6.36; wherein the weight ratio of component a) to b) is 3.5:1 to 2.5:1;
c) 15 to 35 wt % of dialkylphosphate, or the combination of dialkylphosphate and metal salt of phosphorous; the dialkylphosphate is preferably selected from the group consisting of aluminum dimethylphosphinate, aluminum ethylmethylphosphinate, aluminum diethylphosphinate, aluminum methyl-n-propylphosphinate, zinc diethylphosphinate and zinc dimethylphosphinate, the metal salt of phosphorous is preferably selected from the group consisting of $Al(H_2PO_3)_3$, $Al_2(HPO_3)_3$, $Zn(HPO_3)$, $Al_2(HPO_3)_3{\cdot}4H_2O$ and/or $Al(OH)(H_2PO_3)_2{\cdot}2H_2O$;
d) 20 to 40 wt % of fibrous and/or particulate filler;
e) 0 to 15 wt % of impact modifiers, and
f) 0 to 20 wt % of other additives; based on the total weight of the polyamide composition.

In one preferred embodiment, the method for improving inclined plane tracking property at voltage higher than 1 kV by using a polyamide composition, the composition comprising:

a) 20 to 40 wt % of at least one semi-crystalline aliphatic polyamide selected from the group consisting of PA 6, PA 66 and PA6/66;
b) 8 to 15 wt % of at least one long-chain aliphatic polyamide selected from the group consisting of PA1212, 610, 612, 1010 and PA6/6.36; wherein the weight ratio of component a) to b) is 3.5:1 to 2.5:1;
c) 5 to 15 wt % of mineral-based flame retardant and 10-30 wt % of halogenated flame retardant, based on the total weight of the polyamide composition; the mineral-based flame retardant is preferably antimony trioxide; the halogenated flame retardant is preferably brominated polystyrene;
d) 20 to 40 wt % of fibrous and/or particulate filler;
e) 0 to 15 wt % of impact modifiers, and
f) 0 to 20 wt % of other additives; based on the total weight of the polyamide composition.

Preparation of the Polyamide Composition

The polyamide composition of the invention can be produced by processes known per se, by mixing the components in conventional mixing apparatus, such as screw-based extruders, Brabender mixers, or Banbury mixers, and then extruding the same. The extrudate can be cooled and pelletized. It is also possible to premix individual components and then to add the remaining components individually and/or likewise in the form of a mixture. Generally, the screw diameter is 20-40 mm, screw speed is 300 rpm-500 rpm, throughput is 25-35 kg/h, melt temperature is 230 to 320 °C In one preferred embodiment, the polyamide composition is produced by (1) introducing the semi-crystalline aliphatic polyamide (a), the long-chain aliphatic polyamide (b), the impact modifier (e) and additives (f) into an extruder, and (2) introducing the fibrous and/or particulate fillers (d) and flame retardant (c) into the extruder via a downstream feeding zone, kneading and extruding.

The polyamide compositions of the invention features good mechanical properties and highly reproducible flame retardancy classification in accordance with UL 94, and also very good electrical properties at high voltage, such as high IPT and CTI value at voltage of above 1 kV, as high as 1.2 kV, 1.5 kV or even 2 kV.

The polyamide compositions are suitable for the production of fibers, films and moldings of any type. Some examples are plug connectors, plugs, plug parts, cable harness components, circuit mounts, circuit mount components, three-dimensionally injection-molded circuit mounts, electrical connection elements and mechatronic components. Owing to the excellent electrical properties at high voltage, these materials are particularly suitable for producing photovoltaic connector nut and body, outdoor insulative electrical plastic parts.

Another object of the present invention is to provide an article produced by the polyamide composition, which exhibits excellent tracking resistance properties under voltage above 1 kV, for example, 1.2 kV or above, 1.5 kV or above, or up to 2 kV. The article is preferably nut or body of photovoltaic connector or electrically insulative plastic parts.

Another object of the present invention is to provide a polyamide composition comprising

- a) 10 to 50 wt % of at least one semi-crystalline aliphatic polyamide having on average, from 3 to 5 carbon atoms, not including the carbon atom in the amide group, per amide group;
- b) 1 to 40 wt % of at least one long-chain aliphatic polyamide having on average equal to or more than 6 carbon atoms, not including the carbon atom in the amide group, per amide group; the weight ratio of components a) and b) in the polyamide composition is 3.5:1 to 2.5:1;
- c) 4 to 25 wt % of flame retardant including as component c1), red phosphorous and as component c2), triazine-based flame retardant, preferably is melamine phosphate, dimelamine phosphate, melamine pyrophosphate, melamine polyphosphate, dimelamine pyrophosphate, dimelazines phosphate or melamine polyphosphates;
- d) 0 to 50 wt % of fibrous and/or particulate filler;
- e) 1 to 25 wt % of impact modifiers, and
- f) 0 to 20 wt % of other additives.

Component a) is preferably in an amount of from 15 to 45% by weight and in particular from 20 to 40% by weight, based on the total weight of the polyamide composition.

Component b) is preferably in an amount of from 5 to 30% by weight, more preferably from 8 to 25% by weight and in particular from 10 to 20% by weight, based on the total weight of the polyamide composition. In component c), the component c1) is preferably in an amount of 3-15% by weight, more preferably of 5-10% by weight, of the polyamide composition, and the component c2) is preferably in an amount of 1-10% by weight, more preferably of 3-8% by weight, of the polyamide composition.

EXAMPLES

The present invention will now be described with reference to Examples and Comparative Examples, which are not intended to limit the present invention.

The following starting materials were used:

Polyamide 66, BASF, Ultramid A27, viscosity number of 150 $cm^3/g$ according to ISO 307, 1157.

Polyamide 66, BASF, Ultramid A24, viscosity number of 125 $cm^3/g$ according to ISO 307,1157.

Polyamide 1212, Poly(dodecamethylene dodecanoamide), Shandong Dongchen New Technology Co., Ltd., PA1212 Type II.

Polyamide 610, Poly[imino-1,6-hexanediylimino(1,10-dioxo-1,10-decanediyl)], Shandong Dongchen New Technology Co., Ltd., PA610 Type II.

Polyamide 6/6.36, BASF, Ultramid Flex F29.

Polyamide 61/6T, Dupont, Selar 3426.

Glass fiber, Nippon Electric Glass Co., NEG-T251H, length=4.5 mm, diameter=10 um.

Red phosphorous masterbatch with 50 wt % of red phosphorus of average particle size (d50) from 20-25 um and 50 wt % of an olefin polymer, Italmatch Chemicals, Masterbatch 11452-1270, the olefin polymer: 59.8 wt % of ethylene, 35 wt % of n-butyl acrylate, 4.5 wt % of acrylic acid, and 0.7 wt % of maleic anhydride.

Melamine phosphate, BASF, Melapur 200-70.

OP1400, mixture of 80 wt % of OP1230 (aluminum diethylphosphinate) and 20 wt % of PHOPHAL (aluminum phosphate), Clariant.

Brominated polystyrene, Shandong Brother Science & Technology, XZ-6700H.

Antimony trioxide masterbatch, 90 wt % of $Sb_2O_3$ in low density polyethylene (LDPE), Dongguan Jiefu Flame-Retarded Materials Co., Ltd., LDPE90B.

Ethylene Octene Copolymer grafted with MAH, Dupont, Fusabond N493.

Lotader AX8900, a random terpolymer of ethylene, acrylic ester and glycidyl methacrylate, with 8 wt % of glycidyl methacrylate, 24 wt % of acrylic ester, Arkema.

Wax ester, lubricant, Emery Oleochemicals Co., Loxiol G32.

Irganox 1098, antioxidant, BASF.

Zinc oxide, Shenlong, ZnO 99.8%.

UB434, Colloids Ltd., black colorant masterbatch (MB).

Measurement Methods

Inclined plane tracking (IPT) value is measured according to ASTM D2303;

Flame retardant classification is measured according to UL 94, the specimen has the size of 127 mm*12.7 mm*1.6 mm (length*width*thickness);

Comparative test index (CTI) value is measured according to IEC 60112;

Tensile strength, strain at break and E-modulus is measured on Z050 (Zwick Roell, Germany), according to ISO 527-2 with 1A type specimen.

Notched Charpy is done by HIT25P (Zwick Roell, Germany), according to ISO 179/1eA;

Unnotched Charpy is measured on HIT25P (Zwick Roell, Germany), according to ISO 179/1eU.

Example 1

Processing Procedure:

(1) the weight ratio of the components including 31.9 wt % of polyamide 66 (Ultramid A27), 10.5 wt % of polyamide 1212, 8.7 wt % of impact modifier (Fusabond N493), 2 wt % of AX8900, 0.35 wt % of lubricant (Loxiol G32), 0.35 wt % of antioxidant (Irganox 1098), 0.7 wt % of flame retardant accelerator (ZnO) and 2.5 wt % of black colorant MB (UB434) blended in a high speed mixer;

(2) fed the mixture into throat zone in a twin screw extruder;

(3) 25 wt % of glass fiber (NEG-T251H) fed into extruder via a side fiber feeder;

(4) 15 wt % of red phosphorous masterbatch and 3 wt % of Melapur 200-70 fed into extruder via a side powder feeder;

(5) a twin screw extruder granulation was added to cut the extrudate to pellets;

(6) the screw diameter is 26 mm, screw speed is 300 rpm~500 rpm, throughput is 25~35 kg/h, melt temperature is 280 °C Example 2

Processing Procedure:

(1) the weight ratio of the components including 31.9 wt % of polyamide 66 (Ultramid A27), 10.5 wt % of polyamide 610, 8.7 wt % of impact modifier (Fusabond N493), 2 wt % of AX8900, 0.35 wt % of lubricant (Loxiol G32), 0.35 wt % of antioxidant (Irganox 1098), 0.7 wt % of flame retardant accelerator (ZnO) and 2.5 wt % of black colorant MB (UB434) blended in a high speed mixer;

(2) fed the mixer into throat zone in a twin screw extruder;

(3) 25 wt % of glass fiber (NEG-T251H) fed into extruder via a side fiber feeder;

(4) 15 wt % of red phosphorous masterbatch and 3 wt % of Melapur 200-70 fed into extruder via a side powder feeder;

(5) a twin screw extruder granulation was added to cut the extrudate to pellets;

(6) the screw diameter is 26 mm, screw speed is 300 rpm~500 rpm, throughput is 25~35 kg/h, melt temperature is 280 °C Example 3

Processing Procedure:

(1) the weight ratio of the components including 31.9 wt % of polyamide 66 (Ultramid A27), 10.5 wt % of polyamide 6/636, 8.7 wt % of impact modifier (Fusabond N493), 2 wt % of AX8900, 0.35 wt % of lubricant (Loxiol G32), 0.35 wt % of antioxidant (Irganox 1098), 0.7 wt % of flame retardant accelerator (ZnO) and 2.5 wt % of black colorant MB (UB434) blended in a high speed mixer;

(2) fed the mixer into throat zone in a twin screw extruder;

(3) 25 wt % of glass fiber (NEG-T251H) fed into extruder via a side fiber feeder;

(4) 15 wt % of flame retardant red phosphorous masterbatch and 3 wt % of Melapur 200-70 fed into extruder via a side powder feeder;

(5) a twin screw extruder granulation was added to cut the extrudate to pellets (6) the screw diameter is 26 mm, screw speed is 300 rpm~500 rpm, throughput is 25~35 kg/h, melt temperature is 280 °C Comparative Example 1

Processing Procedure:

(1) the weight ratio of the components including 46.9 wt % of polyamide 66 (Ultramid A27), 12.2 wt % of impact modifier (Fusabond N493), 0.35 wt % of lubricant (Loxiol G32), 0.35 wt % of antioxidant (Irganox 1098), 0.7 wt % of flame retardant accelerator (ZnO) and 2.5 wt % of black colorant MB (UB434) blended in a high speed mixer;

(2) fed the mixer into throat zone in a twin screw extruder;

(3) 25 wt % of glass fiber (NEG-T251H) fed into extruder via a side fiber feeder;

(4) 12 wt % of red phosphorous masterbatch fed into extruder via a side powder feeder;

(5) a twin screw extruder granulation was added to cut the extrudate to pellets;

(6) the screw diameter is 26 mm, screw speed is 300 rpm~500 rpm, throughput is 25~35 kg/h, melt temperature is 280 °C Comparative Example 2

Processing Procedure:

(1) the weight ratio of the components including 31.9 wt % of polyamide 66 (Ultramid A27), 10.5 wt % of Selar 3426, 8.7 wt % of impact modifier (Fusabond N493), 2 wt % of AX8900, 0.35 wt % of lubricant (Loxiol G32), 0.35 wt % of antioxidant (Irganox 1098), 0.7 wt % of flame retardant accelerator (ZnO) and 2.5 wt % of black colorant MB (UB434) blended in a high speed mixer;

(2) fed the mixer into throat zone in a twin screw extruder;

(3) 25 wt % of glass fiber (NEG-T251H) fed into extruder via a side fiber feeder;

(4) 15 wt % of flame retardant red phosphorous masterbatch and 3 wt % of Melapur 200-70 fed into extruder via a side powder feeder;

(5) a twin screw extruder granulation was added to cut the extrudate to pellets (6) the screw diameter is 26 mm, screw speed is 300 rpm~500 rpm, throughput is 25~35 kg/h, melt temperature is 280 °C The flame retardant and electrical properties and mechanical properties of the articles produced from the above examples were tested, and the results were summarized in the following table 1:

TABLE 1

Properties of the polyamide composition according to examples 1-3 and comparative examples 1-2

| Ingredient | EX 1 | EX 2 | EX 3 | CE 1 | CE 2 |
|---|---|---|---|---|---|
| PA66, Ultramid ® A27 | 31.9 | 31.9 | 31.9 | 46.9 | 31.9 |
| PA1212 | 10.5 | | | | |
| PA610 | | 10.5 | | | |
| PA6/636 | | | 10.5 | | |
| Selar 3426 | | | | | 10.5 |
| Fusabond N493 | 8.7 | 8.7 | 8.7 | 12.2 | 8.7 |
| AX8900 | 2 | 2 | 2 | | 2 |
| Melapur 200-70 | 3 | 3 | 3 | | 3 |
| Red phosphorus Masterbatch | 15 | 15 | 15 | 12 | 15 |
| Glass fiber, NEG-T251H | 25 | 25 | 25 | 25 | 25 |
| Lubricant, Loxiol G32 | 0.35 | 0.35 | 0.35 | 0.35 | 0.35 |
| Antioxidant, Irganox ® 1098 | 0.35 | 0.35 | 0.35 | 0.35 | 0.35 |
| ZnO | 0.7 | 0.7 | 0.7 | 0.7 | 0.7 |
| UB434 | 2.5 | 2.5 | 2.5 | 2.5 | 2.5 |
| Flame retardant and Electrical Properties | | | | | |
| IPT @ 1.5 kV, min | 120.9 | 143.2 | 160.6 | 34 | 14 |
| IPT @ 2.0 kV, min | 103 | 54.1 | 27.9 | 12 | — |
| UL 94@1.6 mm | V0 | V0 | V0 | V0 | V0 |
| CTI, V | 600 | 600 | 600 | 600 | 600 |

TABLE 1-continued

| Properties of the polyamide composition according to examples 1-3 and comparative examples 1-2 | | | | | |
|---|---|---|---|---|---|
| Ingredient | EX 1 | EX 2 | EX 3 | CE 1 | CE 2 |
| Mechanical Properties | | | | | |
| Tensile strength (MPa) | 87.5 | 93.2 | 93 | 93 | 91.9 |
| Strain at break (%) | 6.4 | 5.5 | 5.9 | 5.9 | 5.4 |
| E-modulus (MPa) | 5860 | 6370 | 6200 | 6200 | 5970 |
| Charpy Notched at 23 °C (kJ/m$^2$) | 18 | 19 | 16 | 16 | 20 |
| Unnotched at 23 °C (kJ/m$^2$) | 82 | 78 | 88.8 | 88.8 | 80 |
| Notched at −40 °C (kJ/m$^2$) | 9.4 | 9.7 | 9.2 | 9.2 | 9.5 |
| Unnotched at −40 °C (kJ/m$^2$) | 68 | 76 | 82 | 82 | 77 |

*"EX" means example, "CE" means comparative example.

From the above table, it can be seen that PA66 alone as the polyamide component, results in composition with poor performance under high voltage of above 1 kV, i.e. very low IPT value, which is unsuitable for applications in electrical technical fields. In contrast, the polyamide composition according to the present invention combines both excellent electrical properties under high voltage and high level of flame retardancy, together with good mechanical properties, making these compositions ideal materials for applications such as photovoltaic connector nut and body, outdoor insulative electrical plastic parts. Of these aliphatic long chain polyamides, PA1212 exhibits better comprehensive properties, obtaining high IPT values both at 1.5 and 2.0 kV.

Particularly, when the long-chain aliphatic polyamide is replaced by aromatic polyamide as shown in comparative example 2, the IPT value under 1.5 kV is significantly lower than those obtained by long-chain aliphatic polyamides, and cannot meet the requirements of PV application at higher voltage.

Example 4

Processing Procedure:

(1) the weight ratio of the components including 23.45 wt % of polyamide 66 (Ultramid A27), 23.45 wt % of polyamide 1212, 12.2 wt % of impact modifier (Fusabond N493), 0.35 wt % of lubricant (Loxiol G32), 0.35 wt % of antioxidant (Irganox 1098), 0.7 wt % of flame retardant accelerator (ZnO) and 2.5 wt % of black colorant masterbatch (UB434) blended in a high speed mixer;
(2) fed the mixer into throat zone in a twin screw extruder;
(3) 25 wt % of glass fiber (NEG-T251H) fed into extruder via a side fiber feeder;
(4) 12 wt % of flame retardant (red phosphorous masterbatch) fed into extruder via a side powder feeder;
(5) a twin screw extruder granulation was added to cut the extrudate to pellets;
(6) the screw diameter is 26 mm, screw speed is 300 rpm~500 rpm, throughput is 25~35 kg/h, melt temperature is 280 °C

Example 5

Processing Procedure:

(1) the weight ratio of the components including 31.4 wt % of polyamide 66 (Ultramid A27), 15.5 wt % of polyamide 1212, 12.2 wt % of impact modifier (Fusabond N493), 0.35 wt % of lubricant (Loxiol G32), 0.35 wt % of antioxidant (Irganox 1098), 0.7 wt % of flame retardant accelerator (ZnO) and 2.5 wt % of black colorant masterbatch (UB434) blended in a high speed mixer;
(2) fed the mixer into throat zone in a twin screw extruder;
(3) 25 wt % of glass fiber (NEG-T251H) fed into extruder via a side fiber feeder;
(4) 12 wt % of flame retardant (red phosphorous masterbatch) fed into extruder via a side powder feeder;
(5) a twin screw extruder granulation was added to cut the extrudate to pellets
(6) the screw diameter is 26 mm, screw speed is 300 rpm~500 rpm, throughput is 25~35 kg/h, melt temperature is 280 °C

Example 6

Processing Procedure:

(1) the weight ratio of the components including 35.1 wt % of polyamide 66 (Ultramid A27), 11.8 wt % of polyamide 1212, 12.2 wt % of impact modifier (Fusabond N493), 0.35 wt % of lubricant (Loxiol G32), 0.35 wt % of antioxidant (Irganox 1098), 0.7 wt % of flame retardant accelerator (ZnO) and 2.5 wt % of black colorant masterbatch blended in a high speed mixer;
(2) fed the mixer into throat zone in a twin screw extruder;
(3) 25 wt % of glass fiber (NEG-T251H) fed into extruder via a side fiber feeder;
(4) 12 wt % of flame retardant (red phosphorous masterbatch) fed into extruder via a side powder feeder;
(5) a twin screw extruder granulation was added to cut the extrudate to pellets
(6) the screw diameter is 26 mm, screw speed is 300 rpm~500 rpm, throughput is 25~35 kg/h, melt temperature is 280 °C The flame retardant and electrical properties of the articles produced from the above examples 4-6 were tested, and the results were summarized in the following table 2:

TABLE 2

| Properties of the polyamide composition according to examples 4-6 | | | |
|---|---|---|---|
| Ingredient | EX 4 | EX 5 | EX 6 |
| PA66, Ultramid ® A27 | 23.45 | 31.4 | 35.1 |
| PA1212, Low viscosity | 23.45 | 15.5 | 11.8 |
| Fusabond N493, | 12.2 | 12.2 | 12.2 |
| Red phosphorus Masterbatch | 12 | 12 | 12 |
| Glass fiber, NEG-T251H | 25 | 25 | 25 |
| Lubricant, Loxiol G32 | 0.35 | 0.35 | 0.35 |
| Antioxidant, Irganox ® 1098 | 0.35 | 0.35 | 0.35 |
| ZnO | 0.7 | 0.7 | 0.7 |
| UB434 | 2.5 | 2.5 | 2.5 |
| Flame retardant and Electrical Properties | | | |
| IPT @ 1.5 kV, min | 165.4 | 119 | 228 |
| UL 94@1.6 mm | Fail | Fail | V1 |

Examples 7-12 and Comparative Examples 3-4

Examples 7-12 were implemented following the processing procedures of examples 1-6, and comparative examples 3-4 were implemented following the processing procedures of comparative examples 1-2, except that the components were added in the amounts listed in the following tables 3-4. The flame retardant and electrical properties of the articles produced from the above examples were tested, and the results were summarized in the following tables 3-4:

TABLE 3

Properties of the polyamide composition according to comparative example 3 and examples 7-9

| Ingredient | CE 3 | EX 7 | EX 8 | EX 9 |
|---|---|---|---|---|
| PA66, Ultramid ® A27 | 46.8 | 35.1 | 35.1 | 35.1 |
| PA1212, Low viscosity | | 11.7 | | |
| PA610 | | | 11.7 | |
| PA6/636 | | | | 11.7 |
| Exolit OP 1400 | 22.5 | 22.5 | 22.5 | 22.5 |
| Glass fiber, NEG-T251H | 30 | 30 | 30 | 30 |
| Calcium stearate | 0.35 | 0.35 | 0.35 | 0.35 |
| Antioxidant, Irganox ® 1098 | 0.35 | 0.35 | 0.35 | 0.35 |
| Flame retardant and Electrical Properties | | | | |
| IPT @ 1.5 kV, min | 124 | 155.5 | 180 | 153.3 |
| UL 94@0.8 mm | V0 | V1 | V0 | V0 |

TABLE 4

Properties of the polyamide composition according to comparative example 4 and examples 10-12

| Ingredient | CE 4 | EX 10 | EX 11 | EX 12 |
|---|---|---|---|---|
| PA66, Ultramid ® A27 | 43.2 | 32.4 | 32.4 | 32.4 |
| PA1212, Low viscosity | | 10.8 | | |
| PA610 | | | 10.8 | |
| PA6/636 | | | | 10.8 |
| Brominated polystyrene, XZ-6700H | 23 | 23 | 23 | 23 |
| LDPE90B | 8.1 | 8.1 | 8.1 | 8.1 |
| Glass fiber, NEG-T251H | 25 | 25 | 25 | 25 |
| Calcium stearate | 0.35 | 0.35 | 0.35 | 0.35 |
| Antioxidant, Irganox ® 1098 | 0.35 | 0.35 | 0.35 | 0.35 |
| Flame retardant and Electrical Properties | | | | |
| IPT @ 1.5 kV, min | 31.4 | 95.3 | 150 | 59.2 |
| UL 94@0.8 mm | V0 | V0 | V0 | V0 |

Under a high voltage of 1.5 kV, the polyamide compositions of the present invention achieved a significantly improved IPT value, while PA66 alone, though in the same amount, only resulted in a much lower IPT value under such a high voltage.

The structures, materials, compositions, and methods described herein are intended to be representative examples of the invention, and it will be understood that the scope of the invention is not limited by the scope of the examples. Those skilled in the art will recognize that the invention may be practiced with variations on the disclosed structures, materials, compositions and methods, and such variations are regarded as within the ambit of the invention. Thus, it is intended that the present invention cover such modifications and variations as come within the scope of the appended claims and their equivalents.

The invention claimed is:

1. A method for improving inclined plane tracking property at voltage higher than 1kV by using a polyamide composition to produce an article, the composition comprising:

a) 10 to 50 wt % of at least one semi-crystalline aliphatic polyamide having on average, from 3 to 5 carbon atoms, not including the carbon atom in the carbonyl group, per amide group;

b) 1 to 40 wt % of at least one long-chain aliphatic polyamide having on average, equal to or more than 6 carbon atoms, not including the carbon atom in the carbonyl group, per amide group;

c) 0 to 35 wt % of flame retardant;

d) 0 to 50 wt % of fibrous and/or particulate filler;

e) 1 to 25 wt % of impact modifier, and f) 0 to 20 wt % of other additives.

2. The method according to claim 1, wherein the at least one semi-crystalline aliphatic polyamide is selected from the group consisting of polyamide 4, polyamide 6, polyamide 56, polyamide 46, polyamide 66 and polyamide 6/66.

3. The method according to claim 1, wherein component a) is in an amount of from 15 to 45% by weight, based on the total weight of the polyamide composition.

4. The method according to claim 1, wherein the at least one long-chain aliphatic polyamide is selected from the group consisting of polyamide 1212, polyamide 610, polyamide 612, polyamide 1010 and polyamide 6/6.36.

5. The method according to claim 1, wherein the component b) is in an amount of from 5 to 30% by weight, based on the total weight of the polyamide composition.

6. The method according to claim 1, wherein the flame retardant comprises c1) 3-20 wt % of red phosphorous, and c2) 1% to 10% of triazine-based flame retardant, based on the total weight of the polyamide composition.

7. The method according to claim 6, wherein the triazine-based flame retardant is selected from the group consisting of melamine phosphate, dimelamine phosphate, melamine pyrophosphate, melamine polyphosphate, dimelamine pyrophosphate, dimelazine phosphate and melamine polyphosphates.

8. The method according to claim 1, wherein the flame retardant c) is in an amount of from 4 to 25% by weight, based on the total weight of the polyamide composition.

9. The method according to claim 1, wherein the filler is glass fiber.

10. The method according to claim 1, wherein the impact modifier is selected from the group consisting of maleic anhydride functionalized polyolefin, glycidyl methacrylate functionalized ethylene ternary copolymer, and combination thereof.

11. The method according to claim 1, wherein the weight ratio of components a) and b) in the polyamide composition is 5:1 to 1:1.

12. The method according to claim 1, wherein the weight ratio of components a) and b) in the polyamide composition is 4:1 to 1:1.

13. The method according to claim 1, wherein the voltage is 1.2kV or above.

14. The method according to claim 1, wherein the polyamide composition comprises a) 10 to 50 wt % of at least one semi-crystalline aliphatic polyamide having on average, from 3 to 5 carbon atoms, not including the carbon atom in the carbonyl group, per amide group;

b) 1 to 40 wt % of at least one long-chain aliphatic polyamide having on average equal to or more than 6 carbon atoms, not including the carbon atom in the carbonyl group, per amide group;

c) 4 to 25 wt % of flame retardant including as component c1), red phosphorous and as component c2), triazine-based flame retardant;

d) 0 to 50 wt % of fibrous and/or particulate filler;

e) 1 to 25 wt % of impact modifier, and f) 0 to 20 wt % of other additives.

15. The method according to claim 1, wherein the article is a nut or body of a photovoltaic connector or an electrically insulative plastic part.

16. The method according to claim 1, wherein the polyamide composition is used for improving inclined plane tracking property at a voltage higher than 1.5kV.

* * * * *